(12) United States Patent
Li et al.

(10) Patent No.: US 9,993,850 B2
(45) Date of Patent: Jun. 12, 2018

(54) GLASS SUBSTRATE DETERGENT TANK AND CLEANING DEVICE

(71) Applicants: Boe Technology Group Co., Ltd., Beijing (CN); Hefei Xinsheng Optoelectronics Technology Co., Ltd., Anhui (CN)

(72) Inventors: Liangliang Li, Beijing (CN); Jaeyun Jung, Beijing (CN); Shikai Wang, Beijing (CN); Dongseob Kim, Beijing (CN); Yadong Liang, Beijing (CN); Mingming Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 63 days.

(21) Appl. No.: 14/744,179

(22) Filed: Jun. 19, 2015

(65) Prior Publication Data

US 2016/0129482 A1 May 12, 2016

(30) Foreign Application Priority Data

Nov. 11, 2014 (CN) .......................... 2014 1 0636109

(51) Int. Cl.
*B65D 25/04* (2006.01)
*B65D 25/38* (2006.01)
(Continued)

(52) U.S. Cl.
CPC ................ *B08B 3/048* (2013.01); *B08B 3/10* (2013.01); *B65D 13/02* (2013.01); *B65D 25/04* (2013.01); *B65D 25/38* (2013.01); *C03C 23/0075* (2013.01)

(58) Field of Classification Search
CPC ........... B08B 3/048; B08B 3/10; B65D 13/02; B65D 25/04; B65D 25/38; C03C 23/0075
(Continued)

(56) References Cited

U.S. PATENT DOCUMENTS 4,224,110 A * 9/1980 McCord .................... C23G 5/04
134/105
5,584,412 A * 12/1996 Wang ...................... B65D 25/04
220/500
(Continued)

FOREIGN PATENT DOCUMENTS

CN 2712428 7/2005
CN 2889525 4/2007
(Continued)

OTHER PUBLICATIONS

Office action from Chinese Application No. 201410636109.4 dated Apr. 20, 2016.
(Continued)

*Primary Examiner* — J. Gregory Pickett
*Assistant Examiner* — Niki M Eloshway
(74) *Attorney, Agent, or Firm* — Calfee, Halter & Griswold LLP

(57) ABSTRACT

The present disclosure relates to the technical field of glass substrate cleaning. Specifically, the present disclosure provides a glass substrate detergent tank which can solve the technical problem of wasting detergent solution. The detergent tank includes a tank body enclosed by a top face, a bottom face and side faces. There are a water inlet, a water outlet and a vent hole in tank body. There is a partition plate disposed between two facing inside faces of the tank body, which separate the tank body into two cavities communicating at the bottom. The detergent tank according to the embodiment of the present disclosure will not let froth (Continued)

discharge outside the tank body with gas, and thus can reduce the amount of wasted detergent solution, thereby extending the usage time of the detergent solution.

12 Claims, 2 Drawing Sheets

(51) Int. Cl.
*B08B 3/04* (2006.01)
*B65D 13/02* (2006.01)
*B08B 3/10* (2006.01)
*C03C 23/00* (2006.01)
*B65D 1/24* (2006.01)

(58) Field of Classification Search
USPC .................. 220/501, 534, 601, 550, 541
See application file for complete search history.

(56) References Cited

U.S. PATENT DOCUMENTS

| | | | | |
|---|---|---|---|---|
| 6,006,901 | A * | 12/1999 | Pereira Da Silva | A47K 5/08 206/540 |
| 6,311,863 | B1 * | 11/2001 | Fleming | A47G 19/2211 220/367.1 |
| 6,332,675 | B1 * | 12/2001 | Koitabashi | B41J 2/17506 347/86 |
| 6,375,033 | B1 * | 4/2002 | Fleming | A47G 19/2272 220/367.1 |
| 2008/0041226 | A1 * | 2/2008 | Hiltzik | B01D 53/0438 95/90 |
| 2010/0224214 | A1 * | 9/2010 | Kaneko | B08B 3/048 134/1 |
| 2011/0168721 | A1 * | 7/2011 | Waite | C02F 3/1242 220/553 |
| 2014/0000660 | A1 * | 1/2014 | Kanbe | B08B 3/048 134/40 |
| 2016/0229587 | A1 * | 8/2016 | Keller | B65D 25/04 |

FOREIGN PATENT DOCUMENTS

| | | |
|---|---|---|
| CN | 103121027 | 5/2013 |
| CN | 203155600 | 8/2013 |
| CN | 203768464 | 8/2014 |
| JP | H10328649 | 12/1998 |
| JP | 2000252255 | 9/2000 |

OTHER PUBLICATIONS

Office action from Chinese Application No. 201410636109.4 dated Dec. 21, 2015.
Office Action from China Application No. 201410636109.4 dated Sep. 27, 2016.
Decision on Rejection for Chinese Application No. 201410636109,4 dated Dec. 29, 2016.

* cited by examiner

GLASS SUBSTRATE DETERGENT TANK AND CLEANING DEVICE

RELATED APPLICATIONS

The present application claims the benefit of Chinese Patent Application No. 201410636109.4, filed on Nov. 11, 2014, the entire disclosure of which is incorporated herein by reference.

BACKGROUND OF THE DISCLOSURE

1. Field of the Disclosure

The present disclosure relates to the technical field of glass substrate cleaning, in particular to a glass substrate detergent tank and a cleaning device.

2. Description of the Prior Art

During the manufacture process of the array of TFT-LCD (Thin Film Transistor-Liquid Crystal Display), the glass substrate needs to be cleaned. Therefore, the glass cleaning capability is very important to the entire manufacture process of the liquid crystal display. Usually, traditional cleaning device mainly comprises a DET (detergent tank). During the process of cleaning glass substrate by the detergent tank, due to the property of the detergent, froth is easily generated under water flow impact. The froth usually floats over the liquid level of the detergent solution, and part of the froth might discharge outside the detergent tank with gas when discharging gas, so that the amount of lost detergent solution will be increased, and the usage time of the detergent solution will be reduced.

SUMMARY OF THE DISCLOSURE

An embodiment of the present disclosure discloses a glass substrate detergent tank, which can solve the problem that some of the detergent solution gets lost due to discharging outside the tank body with gas and the usage time of the detergent solution is reduced because of this.

In order to achieve the above object, an embodiment of the present disclosure employs the following technical solution.

The present disclosure provides a glass substrate detergent tank comprising a tank body enclosed by a top face, a bottom face and side faces. There are a water inlet, a water outlet and a vent hole in tank body. There is a partition plate disposed between two inside faces of the tank body, which separate the tank body into two cavities communicating at the bottom; and the level of the upper edge of the partition plate is higher than the liquid level of the detergent solution in the tank body.

According to an aspect of the present disclosure, two facing inside faces of the tank body is each provided with a fixation clamp respectively, and the partition plate is fixed to the fixation clamps; or alternatively, the two facing inside faces of the tank is each provided with a pair of fixation clamps respectively, and the partition plate is inserted between the pairs of fixation clamps.

According to an aspect of the present disclosure, the level of the upper edge of the partition plate is higher than the predetermined upper limit level of the detergent solution in the tank body.

According to an aspect of the present disclosure, the level of the lower edge of the partition plate is lower than the predetermined lower limit level of the detergent solution in the tank body.

According to an aspect of the present disclosure, the vent hole is located in the top face or the upper portion of a side face of the tank body.

According to an aspect of the present disclosure, the water inlet is in the top face of the tank body and a water inlet tube is inserted in the water inlet.

According to an aspect of the present disclosure, the tube orifice of the water inlet tube extends into the bottom of the tank body.

According to an aspect of the present disclosure, the water outlet is located in the top face of the tank body and a water return tube is inserted in the water outlet, the tube orifice of the water return tube extends into the bottom of the tank body.

According to an aspect of the present disclosure, the bottom tube orifice of the water inlet tube and the bottom tube orifice of the water return tube are located at the same side of the partition while the vent hole is located at the other side of the partition plate.

In the embodiment of the present disclosure, the tank body of the glass substrate detergent tank is separated into two cavities communicating at the bottom by the partition plate; the detergent solution in the tank body can flow freely at the bottom of the detergent tank. Because the level of the upper edge of the partition plate is higher than the liquid level of the detergent solution in the tank body, the froth in the detergent solution is blocked by the upper edge of the partition plate, avoiding the froth to get into the detergent tank cavity with the vent hole. In this way, the froth will not be discharged outside the tank body with gas, thus effectively reducing the amount of wasted detergent solution and extending the usage time of the detergent solution.

The present disclosure also provides a glass substrate cleaning device, which comprises the above described glass substrate detergent tank.

The beneficial effects brought about by the glass substrate cleaning device is the same with the beneficial effects brought about by the above described glass substrate detergent tank.

DETAILED DESCRIPTION OF THE PRESENT DISCLOSURE

The main concept of the present disclosure lies in that: the tank body of the glass substrate detergent tank is separated into two cavities communicating at the bottom by the partition plate; the detergent solution in the tank body can flow freely at the bottom of the detergent tank. Because the level of the upper edge of the partition plate is higher than the liquid level of the detergent solution in the tank body, the froth in the detergent solution is blocked by the upper edge of the partition plate, avoiding the froth to get into the detergent tank cavity with the vent hole. In this way, the froth will not be discharged outside the tank body with gas when discharging gas, thus effectively reducing the amount of wasted detergent solution and extending the usage time of the detergent solution.

The glass substrate detergent tank according to an embodiment of the present disclosure will be described in more detail in conjunction with drawings.

First Embodiment

Figure 1:
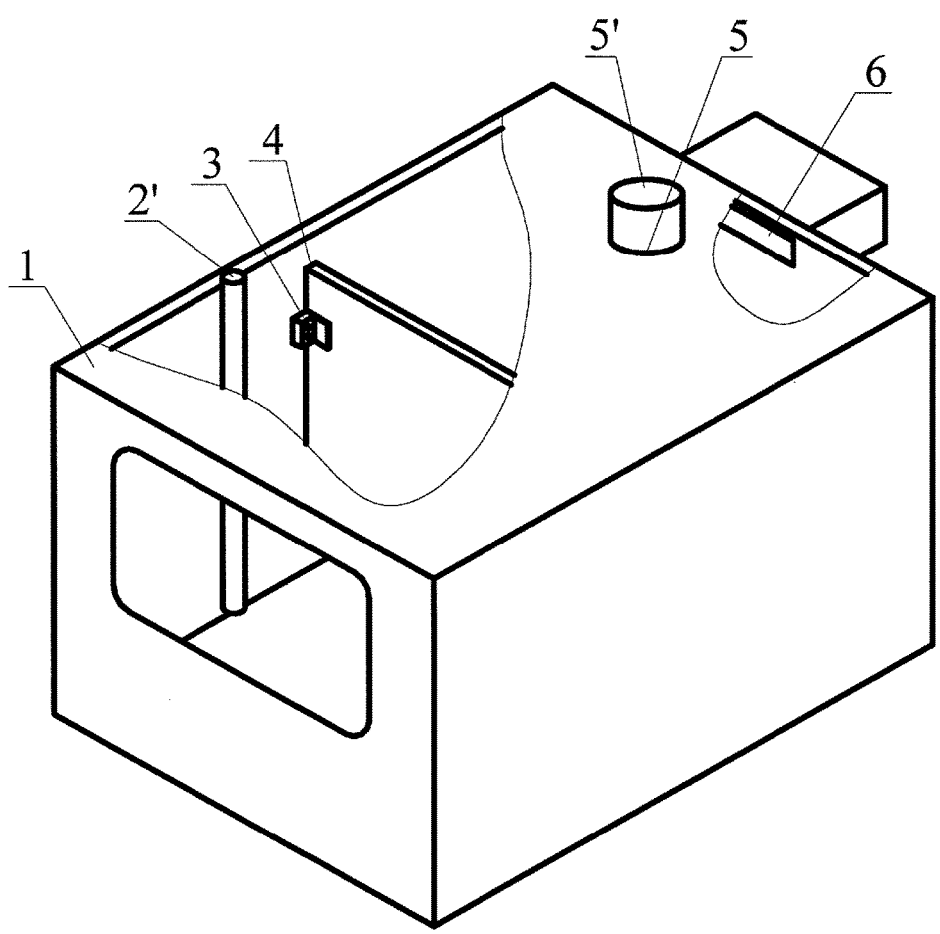
FIG. 1 is a schematic view showing the three dimensional structure of a glass substrate detergent tank according to an embodiment of the present disclosure with partial cutaway.
Figure 2:
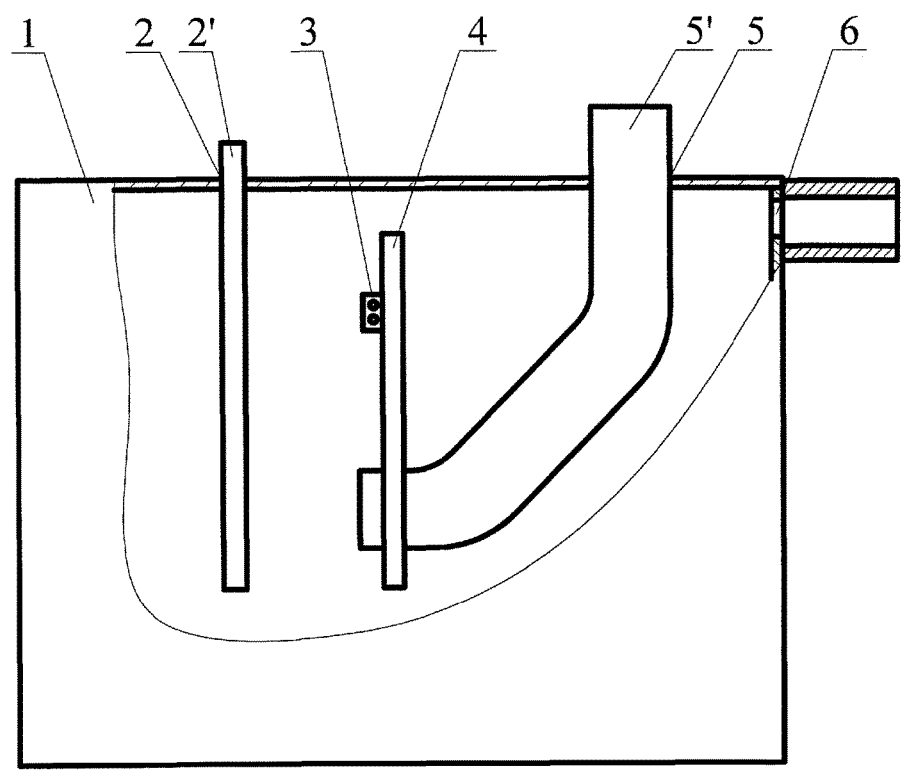
FIG. 2 is a schematic front view showing the structure of the glass substrate detergent tank according to the embodiment of the present disclosure with partial cutaway.

An embodiment of the present disclosure is a glass substrate detergent tank, as shown in FIG. 1 and FIG. 2, comprising a tank body 1 enclosed by a top face, a bottom face and side faces. There are a water inlet 5, a water outlet 2 and a vent hole 6 in tank body 1. There is a partition plate 4 disposed between two facing inside faces of the tank body 1, which can separate the tank body into two cavities communicating at the bottom; and the level of the upper edge of the partition plate 4 is higher than the liquid level of the detergent solution in the tank body 1.

In the embodiment of the present disclosure, the tank body 1 of the glass substrate detergent tank is separated into two cavities communicating at the bottom by the partition plate 4, i.e., left cavity and right cavity as shown in FIG. 1 and FIG. 2. The detergent solution in the tank body 1 can flow freely at the bottom of the detergent tank. The froth in the detergent solution is blocked by the upper edge of the partition plate 4, avoiding the froth to get into the detergent tank cavity with the vent hole 6, i.e. the right cavity. In this way, the froth will not be discharged outside the tank body 1 with gas when discharging gas, thus effectively reducing the amount of wasted detergent solution and extending the usage time of the detergent solution. Practical test check proves that the usage time of the detergent solution increases from 160 minutes to over 500 minutes. That is to say, the usage time of the detergent solution is significantly increased by more than 3 times, thereby reducing the usage cost of the detergent solution. Besides, because the froth will not be discharged outside the tank with gas when discharging gas, the change of the concentration of the detergent solution itself is slight, so that the cleaning capability of the detergent solution and thus the cleaning quality of the glass substrate surface can be guaranteed, and therefore the quality of the whole liquid crystal display can be guaranteed. This structured detergent tank also has the advantages of being simple in structured and low in manufacturing.

Two facing inside faces of the tank body 1 are each provided with a fixation clamp 3 respectively. The partition plate 4 is fixed on the fixation clamps 3 (as shown in FIG. 1 and FIG. 2). Or alternatively, the two facing inside faces of the tank body 1 are each provided with a pair of fixation clamps respectively. The partition plate 4 is inserted between the pairs of fixation clamps. This mounting structure by means of inserting has the advantages of simple structure and convenient dismantling.

The upper edge of the partition plate 4 is higher than the predetermined upper limit level of the detergent solution in the tank body 1. Even though the detergent solution in the tank body 1 reaches its upper limit level, the function of isolating froth by the partition plate can be ensured.

The lower edge of the partition plate 4 is lower than the predetermined lower limit level of the detergent solution in the tank body 1. Even though the detergent solution in the tank body 1 reaches its lower limit level, the function of isolating froth by the partition plate can be ensured.

As shown in FIG. 1, a vent hole is in the upper portion of a side face (or top face) of the tank body 1. The level of the vent hole 6 is higher than the upper limit level of the detergent solution in the tank body 1.

As shown in FIG. 2, the water inlet is in the top face of the tank body 1, and a water inlet tube 5' is inserted in the water inlet 5. The tube orifice of the water inlet tube 5' extends into the bottom of the tank body 1. In this way, liquid splashing can be avoided when water is flowing in to the tank, so that the generation rate of the froth can be reduced.

As shown in FIG. 2, the water outlet 2 is in the top face of the tank body 1, and a water return tube 2' is inserted in the water outlet 2. The tube orifice of the water return tube 2' extends into the bottom of the tank body 1. In this way, it can ensure that the detergent solution in the tank body 1 can circulate and flow sufficiently.

The bottom tube orifice of the water inlet tube 5 is at the same side of the partition plate 4 with the bottom tube orifice of the water return tube 2, and as shown in FIG. 2 and FIG. 2, both of them are located in the cavity at the left of the partition plate 4. The vent hole 6 is at the other side of the partition plate 4, that is to say, the vent hole 6 is in the cavity at the right of the partition plate 4. Such configuration not only can ensure sufficient recycling of the detergent solution, but also can isolate the generation source of the detergent froth and the vent hole 6 so that the froth can be isolated from the cavity at the right side of the tank body 1.

The present disclosure also provides a glass substrate cleaning device, which comprises the glass substrate detergent tank according to first embodiment.

The beneficial effects brought about by the glass substrate cleaning device is the same with the beneficial effects brought about by the above described glass substrate detergent tank.

In the description of the present disclosure, the terms used herein to describing orientations or positional relationships such as "upper" and "lower", "top", and "bottom", "inside" and "outside", are based on the orientation or positional relationship illustrated in the drawings, which are only used for ease of description and simplicity of description, and not to suggest or imply that the mentioned devices or elements must adopt certain orientation, construct or operate with certain orientation, and thereby those terms will not restrict the present disclosure in this respect.

In the description of the present specification, specific feature, structure, material and characteristics can be combined in any one or more embodiments or examples.

The above description is only an implementation of the present disclosure. The scope of the present disclosure will not be restricted by it. Those skilled in the art can easily envision modifications and substitutes within the technical scope of the present disclosure, which are in the protection scope of the present disclosure. Therefore, the protection scope of the present disclosure should be determined by the protection scope of the claims.

The invention claimed is:

1. A glass substrate detergent tank comprising a tank body enclosed by a top face, a bottom face and side faces; wherein a water inlet, a water outlet and a vent hole are in the tank body; wherein a partition plate is disposed between two facing inside faces of the tank body, wherein the partition plate separates the tank body into two cavities communicating both at the top and at the bottom; and a level of an upper edge of the partition plate is higher than a liquid level of a detergent solution in the tank body and lower than the top face; the water outlet is located in the top face of the tank body and a water return tube is inserted in the water outlet, a bottom tube orifice of the water return tube extends into a bottom of the tank body; wherein the water inlet is in the top face of the tank body and a water inlet tube is inserted in the water inlet; and wherein a bottom tube orifice of the water inlet tube and the bottom tube orifice of the water return tube are located in one of the two cavities and the vent hole is located in the other of the two cavities.

2. The glass substrate detergent tank according to claim 1, wherein the two facing inside faces of the tank body each have a fixation clamp, and the partition plate is fixed to the fixation clamps; or alternatively, the two facing inside faces of the tank are each provided with a pair of fixation clamps, and the partition plate can be inserted between the pairs of fixation clamps.

3. The glass substrate detergent tank according to claim 1, wherein the level of the upper edge of the partition plate is higher than a predetermined upper limit level of the detergent solution in the tank body.

4. The glass substrate detergent tank according to claim 1, wherein a level of the lower edge of the partition plate is lower than a predetermined lower limit level of the detergent solution in the tank body.

5. The glass substrate detergent tank according to claim 1, wherein the vent hole is located in the top face or an upper portion of one of the side faces of the tank body.

6. The glass substrate detergent tank according to claim 1, wherein a tube orifice of the water inlet tube extends into a bottom of the tank body.

7. A glass substrate cleaning device, comprising a glass substrate detergent tank comprising a tank body enclosed by a top face, a bottom face and side faces; wherein a water inlet, a water outlet and a vent hole are in the tank body; wherein a partition plate is disposed between two facing inside faces of the tank body separating the tank body into two cavities; wherein the two cavities are in fluid communication both at the top and at the bottom of the tank; and wherein a level of an upper edge of the partition plate is higher than a liquid level of a detergent solution in the tank body and lower than the top face; the water outlet is located in the top face of the tank body and a water return tube is inserted in the water outlet, a bottom tube orifice of the water return tube extends into a bottom of the tank body; wherein the water inlet is in the top face of the tank body and a water inlet tube is inserted in the water inlet and wherein a bottom tube orifice of the water inlet tube and the bottom tube orifice of the water return tube are located in one of the two cavities and the vent hole is located in the other of the two cavities.

8. The glass substrate cleaning device according to claim 7, wherein the two facing inside faces of the tank body are each provided with a fixation clamp, and the partition plate is fixed to the fixation clamps; or alternatively, the two facing inside faces of the tank are each provided with a pair of fixation clamps, and the partition plate can be inserted between the pairs of fixation clamps.

9. The glass substrate cleaning device according to claim 7, wherein the level of the upper edge of the partition plate is higher than a predetermined upper limit level of the detergent solution in the tank body.

10. The glass substrate cleaning device according to claim 7, wherein a level of a lower edge of the partition plate is lower than a predetermined lower limit level of the detergent solution in the tank body.

11. The glass substrate cleaning device according to claim 7, wherein the vent hole is located in the top face or an upper portion of one of the side faces of the tank body.

12. The glass substrate cleaning device according to claim 7, wherein a tube orifice of the water inlet tube extends into the bottom of the tank body.

* * * * *